United States Patent [19]

Henningsson

[11] 4,345,622

[45] Aug. 24, 1982

[54] CONTROL AND CUT-OFF DEVICE FOR FLOWING MEDIA

[75] Inventor: Thom L. Henningsson, Sollentuna, Sweden

[73] Assignee: Ingenjorsfirma T. Henningsson AB, Sweden

[21] Appl. No.: 199,507

[22] PCT Filed: Nov. 16, 1979

[86] PCT No.: PCT/SE79/00238

§ 371 Date: Jul. 24, 1980

§ 102(e) Date: Jul. 22, 1980

[87] PCT Pub. No.: WO80/01100

PCT Pub. Date: May 29, 1980

[30] Foreign Application Priority Data

Nov. 24, 1978 [SE] Sweden .............................. 7812130

[51] Int. Cl.$^3$ .......................... F17D 3/01; F16K 5/10
[52] U.S. Cl. ................................. 137/637.1; 137/597; 137/599.1; 251/209
[58] Field of Search ................ 137/625.28, 625.29, 137/625.3, 625.31, 625.32, 637, 637.1, 637.2, 637.3, 599, 599.1, 637.5; 251/205, 208, 209

[56] References Cited

U.S. PATENT DOCUMENTS

| | | | |
|---|---|---|---|
| 1,354,522 | 10/1920 | Takala | 137/637.3 |
| 1,496,584 | 6/1924 | McCrink | 137/597 |
| 2,491,429 | 12/1949 | Thomas, Sr. | 137/637.3 |
| 2,500,239 | 3/1950 | Beyette | 137/597 |
| 2,642,254 | 6/1953 | Armstrong | 137/637.2 |
| 2,867,237 | 1/1959 | Allingham | 137/625.29 |
| 3,618,855 | 11/1971 | Nilsson et al. | 137/599.1 |

FOREIGN PATENT DOCUMENTS

| | | | |
|---|---|---|---|
| 2259698 | 7/1973 | Fed. Rep. of Germany | 137/625.29 |
| 142415 | 10/1950 | Sweden | |
| 1042619 | 9/1966 | United Kingdom | 137/599.1 |
| 1298415 | 12/1972 | United Kingdom | 137/599.1 |

Primary Examiner—George L. Walton
Attorney, Agent, or Firm—Lewis H. Eslinger

[57] ABSTRACT

Control and cut-off device for media flowing to consumer apparatuses and flow back therefrom. For example, dosing equipment, ventilation assemblies, heating and cooling arrangments, among which also conditioning plants are classified. The valve is then made especially to be reliable also after a long period of service, to give a close control of a small quantities of medium, to be capable of admitting locking of the pre-setting and thereby to prevent unauthorized persons from making a resetting without difficulty and to admit cutting-off of the consumer apparatuses from the source of medium. The control and cut-off device according to the invention includes a valve housing, having two connection openings connection to a source of medium and two connection openings for connection to consumer devices and within the valve housing a rotation control and cut-off member to control and cut-off the flow of medium. The valve housing is then provided with a cylindrical boring with which the connection openings have connection, a first tubular valve slide being rotatably mounted in the boring and having a cylindrical boring into which a second tubular valve slide is rotatably fitted. These valves slides are provided with openings so that they bring about a control or cut-off, respectively, of the medium by rotation.

6 Claims, 5 Drawing Figures

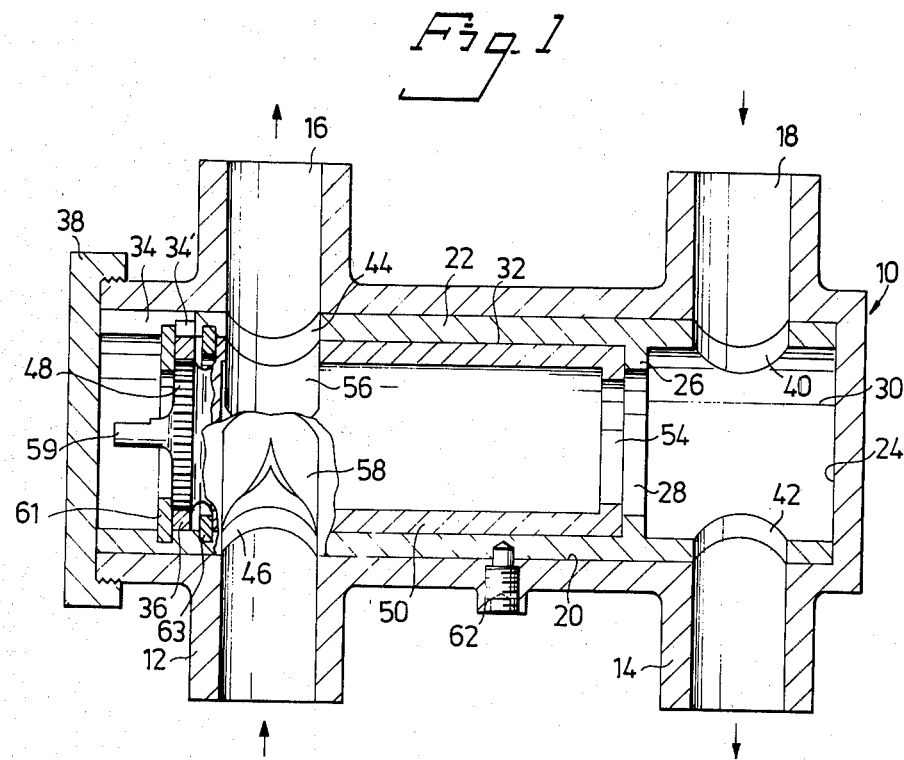
Fig. 1
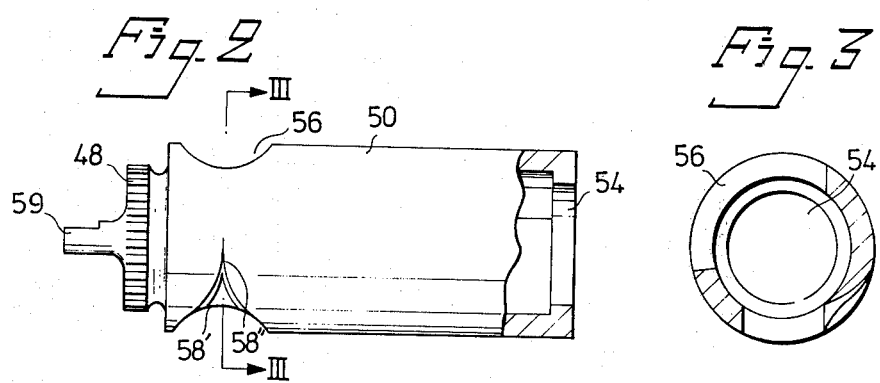
Fig. 2
Fig. 3

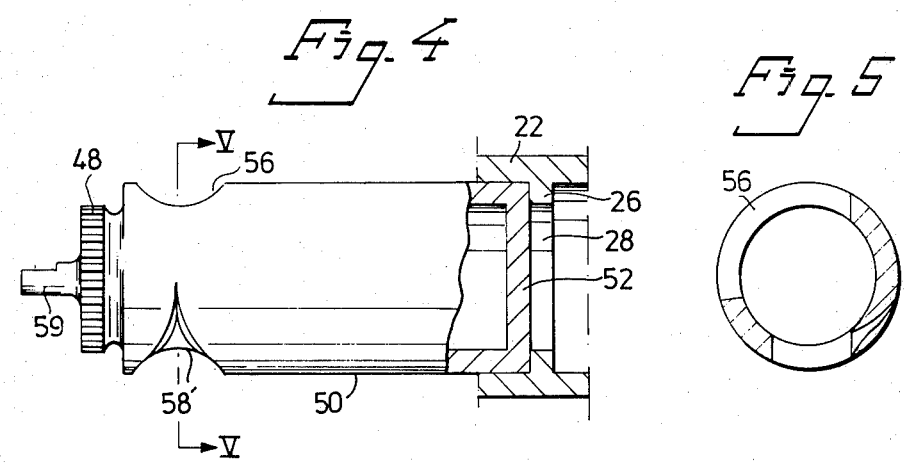

CONTROL AND CUT-OFF DEVICE FOR FLOWING MEDIA

TECHNICAL FIELD

The present invention refers to a control and cut-off device.

This control and cut-off device is intended for so-called pre-setting of media flowing to consumer apparatuses and flowing back therefrom and to cut-off the consumer apparatus from a source of medium. As examples may be mentioned dosing equipments for realizing chemical processes of various kinds, ventilation assemblies, heating and cooling plants among which conditioning plants (air condition) are also classified.

BACKGROUND ART

Control and cut-off devices of this kind known up to now have been found to be unreliable and have not provided the desired function owing to a too primitive design, as unauthorized persons have been able to change the pre-set position without difficulty. Also the precision has been inferior and the valves have been incapable of function even after a short period of use. They have also been too unwieldy or costly in respect of manufacture and maintenance and have often consisted of two individual valves which have been built together.

DISCLOSURE OF INVENTION

The invention aims at removing the drawbacks of prior control and cut-off devices and to provide a device which is reliable, even after a long period of use, precisely and easily adjustable and so designed that it is compact and simple manufacture. It should be easy to pre-set and for the pre-setting a special key is used. Accordingly, the pre-setting can be changed only by authorized persons which have been provided with this key.

This is achieved by the fact that the control and cut-off device according to the invention has been given the characteristics defined in the patent claims.

BRIEF DESCRIPTION OF DRAWINGS

The invention is explained more in detail in connection with the drawings showing an embodiment of the invention.

FIG. 1 is a longitudinal section of the device according to the invention,

FIG. 2 shows a detail included in the device according to FIG. 1 in a lateral view, FIG. 3 is a section along the line III—III in FIG. 2, FIG. 4 shows an alternative design of the detail in FIG. 2, and FIG. 5 shows a section along the line V—V in FIG. 4.

BEST MODE OF CARRYING OUT THE INVENTION

The control and cut-off device for media shown in the drawing includes a valve housing 10 having an inlet opening 12 and an outlet opening 14 for connection to a source of medium. The opening 12 can of course also be used as outlet and the opening 14 as an inlet, signifying that the direction of flow through the valve housing 10 is thereby reversed. This also applies to two openings 16, 18 which may be inlet and outlet or vice versa for a consumer apparatus or device which is intended for connection to these two openings and in which the medium is to be used, for example dosing equipment, ventilation apparatus, heat exchanger, radiator, cooling plant or consumer devices comparable therewith.

The valve housing 10 has a longitudinal cylindrical boring 20 in which there is an insertable and rotatable cut-off slide 22 similarly of cylindrical design. The slide 22 abuts with its right hand end, as seen in the drawing, against the bottom 24 of the boring 20 and is formed at its inner wall between the two openings 16, 18 with a peripheral flange 26, forming an opening 28 which divides the interior of the slide into two chambers 30 and 32. At its other, left hand end, as seen in the drawing, the slide 22 is provided with a peripheral groove 34 for receiving a locking washer 36, the purpose of which will be described in the following. The slide 22 is kept in its position in the boring 20 by a closing member 38 being fixably arranged for example by means of a screw thread at the left hand end of the valve housing 10, as seen in FIG. 1, whereby it will abut against the slide 22 and lock it against axial motion in its position.

The chamber 30 of the cut-off slide 22 is provided with two openings 40, 42 which connect the chamber 30 with the openings 14 and 18 of the valve housing and which may have any desired shape according to the demands which are made on the connection between the chamber and the openings of the valve housing. The chamber 32 of the slide 22 also has two openings 44 and 46 which connect the chamber 32 with the openings 12 and 16 of the valve housing and which may be of any desired shape according to the demands made.

In the chamber 32 there is provided a control slide or adjustment slide 50, see also FIGS. 2 and 4, which slide 50 at its right hand end, as seen in the drawing, is provided with a wall 52 which, on the one hand, may be closed as shown in FIG. 4 or, on the other hand, as shown in FIGS. 1 and 2, may be provided with an opening 54, to that the medium may pass between the chamber 30 and the interior of the control slide 50. The opposite end of the control slide 50, that to the left in the drawing, is closed and towards the periphery an exterior splines coupling 48 is provided which cooperates with an interior splines coupling on the locking washer 36. Furthermore, the locking washer 36 is provided with a projection 34' which cooperates with the groove 34 to lock the control slide 50 against rotation in relation to the cut-off slide 22. Axially the control slide 50 is maintained locked by a locking ring 63, for example an interior seger security member. From the closed end of the control slide 50 a member 59 is furthermore provided for enabling rotation of the control slide 50 when it is located within the slide 22. In addition the control slide 50 is provided with two openings 56 and 58 which cooperate with the two openings 12 and 16 of the valve housing 10 via the two openings 44 and 46 of the slide 22. The opening 56 may be shaped in the same way as the other openings in the slide 22 according to the desired function. In FIGS. 3 and 5 the opening 56 is shown in the shape of a slot which extends along the periphery of the adjustment slide 50. The opening 58 in one direction has a semicircular wall 58 and in the other direction a wall which tapers off into a point 58" which is formed so as to give a desired flow characteristic depending on the adjustment position of the slide for controlling the flow of medium between the control slide 50 and the cut-off slide 22.

When adjusting the cut-off slide 22 the groove 34 is utilized into which a special wrench may be inserted and effect a rotation of the same. In the valve housing there is a marking for indicating the position of the slide 22. If the locking ring 36 is in its position the control slide 50 will take part in the rotation. If the locking ring 36 is removed the control slide 50 may be rotated in relation to the slide 22 and for that purpose the member 59 is utilized. Possibly the splines 48 on the control slide 50 may also be utilized for effecting this rotation. Here also there is a marking for dindicating the relative position of the slides 22, 50. A locking screw 62 is provided in the valve housing 10, said screw restricting the rotation of the slide 22. The locking screw 62 also effects a certain locking action in the axial direction. The locking washer 36 is fixed axially by an outer locking ring 61, for example a seger security member. This locking ring is also intended to make it more difficult for unauthorized persons to get at the locking washer 36 and thereby be able to carry out unauthorized resettings of established adjustments of the control slide 50.

In FIGS. 4 and 5 an alternative form of the control slide 50 is shown which is intended for a two-tube installation. Here the control slide 50 is without the opening in the end wall and control takes place only between the control slide 50 and the slide 21. When using the control and cut-off device it functions in the following way: the medium flows into the valve housing 10, for example through the opening 12. A first part of the medium passes further through the opening 16 to the consumer device. A second part of the medium passes in the embodiment shown in FIGS. 1 and 2 and having the opening 54 through the latter to the chamber 30 and here combines with the said first part of the medium which returns from the consumer device and flows out through the opening 14.

If the wall 52 of the control slide 50 is closed, all the medium passes through the opening 16, since because of the closed wall 52 no by-pass flow is possible. The first embodiment with openings 54 can be applied for example to one-tube systems (series systems with shunt-connected apparatuses) and the second embodiment with closed wall 52 to two-tube systems (apparatuses connected in parallel).

The cut-off slide 22 can be used, on the one hand, for effecting pre- or rough adjustment, on the other hand, for wholly cutting off the openings 16, 18, whereupon the consumer apparatus connected to the openings 16, 18 can be dismounted to be replaced by another or for repair. For example, the openings in the cut-off slide 22 may be formed such that by rotating the slide 22 a predetermined angle in one direction in relation to the valve housing 10 the flow of the medium to the consumer apparatus is interrupted but at the same time the flow of the medium through the valve housing 10 is made possible. By rotating the slide 22 a predetermined angle in the opposite direction the connection openings 12, 14 of the valve housing 10 (to the connection lines) are closed.

The control slide 50 is intended to effect fine adjustment of the medium passing through the valve housing 10; for this purpose the opening 58 is formed in the way shown in the drawing with a side of the opening 58 bounded at a point 58". By this means a flow characteristic can be realized which admits a very simple adjustment of the small amounts of liquid desired to be passed through.

With the control slide 50 in the position shown in the drawing a control of the amount of flowing medium may be realized by rotating the slide 50 in relation to the slide 22 so that a major or minor part of the opening 58 is uncovered according to FIG. 2 in relation to the inlet opening 12. If the control slide 50 is constructed according to FIG. 2, one-tube system, this adjustment applies to the total flow in the one-tube loop but is not influenced by the flow in the radiator circuit. If the control slide 50 is of a construction according to FIG. 2, two-tube system, the adjustment applies also now to the total flow but this equals the flow in the radiator circuit.

If the control slide 50 is rotated so that the control takes place between the openings 16 and 58 a control of the flow in the radiator circuit will take place also now, but according to two different principles depending upon how the control slide 50 is constructed.

In the construction according to FIG. 2, one-tube system, the adjustment is directed to how much percent of the total flow forms the flow in the radiator circuit.

In the construction according to FIG. 4, two-tube system, the adjusted radiator flow equals the total flow in the valve. These different control possibilities thus apply to both one- and two-tube systems, and the adjusted position is not changed when cutting off by means of the slide 22.

The consumer apparatus connected to the openings 16, 18 can of course be provided with a readjustment valve in which the flow in the radiator circuit can be reduced individually either manually or automatically and in this way it can be prevented that the room temperature becomes to high owing to sun heat, heat emitting apparatuses or people's body heat.

INDUSTRIAL APPLICABILITY

The device is used in connection with dosing equipment, ventilation assemblies, heating and cooling arrangements, among which also conditioning plants are classified.

I claim:

1. A control and cut-off device for flowing media in plants where one or more consumer devices are to be supplied with a medium are connected to a source of such medium, said control and cut-off device including a valve housing having two connection openings for connection to said source of medium and two connection openings for connection to said consumer devices and control and cut-off members rotatable within the valve housing to control and cut-off the flow of medium from the source of medium to the consumer devices and again back to the source, the valve housing being provided with a cylindrical boring with which the connection openings communicate, a first tubular valve slide being rotatably mounted in the boring and having a cylindrical boring in which a second tubular valve slide is rotatably fitted, said slides being locked against axial displacement when in use and provided with openings arranged to effect control or cut-off, respectively, of the medium when rotating the slides, and wherein the first valve slide is provided with a peripheral annular locking ring arranged to lock the second valve slide against axial movement in relation to the first valve slide such that when said locking ring locks said second valve slide against axial movement said first and second valve slides are locked to rotate together within said valve housing, when said locking ring is released from locking the second valve slide, said first and second valve slides are permitted to rotate relative to each other for selecting a control or cut-off mode of the flow of medium to at least one said consumer device, and when said locking ring again locks said second valve slide, said valve slides are rotationally locked together and said control and cut-off device is able to vary and block the flow of medium to the consumer device.

2. A control and cut-off device for flowing media in plants where one or more consumer devices are to be supplied with a medium are connected to a source of such medium, said control and cut-off device including a valve housing having two connection openings for connection to said source of medium and two connection openings for connection to said consumer devices and control and cut-off members rotatable within the valve housing to control and cut-off the flow of medium from the source of medium to the consumer devices and again back to the source, the valve housing being provided with a cylindrical boring with which the connection openings communicate, a first tubular valve slide being rotatably mounted in the boring and having a cylindrical boring in which a second tubular valve slide is rotatably fitted, said slides being locked against axial displacement when in use and provided with openings arranged to effect control or cut-off, respectively, of the medium when rotating the slides, wherein the second valve slide is provided with axial splines, at the end thereof facing the opening of the boring, the first valve slide at the corresponding end is provided with an axial groove, and a locking washer having internal splines and a projection is intended to cooperate with the splines of the second valve slide and the groove to hold the two slides against rotation in relation to each other. such that when said locking washer engages said splines of said second valve slide, said first and second valve slides are held against rotation in relation to each other within said valve housing, when said locking washer is released from the splines of the second valve slide, said first and second valve slides are permitted to rotate relative to each other for selecting a control or cut-off mode of the flow of medium to at least one said consumer device, and when said locking washer again engages the splines of said second valve, said valve slides are rotationally locked together and said control and cut-off device is now able to vary and block the flow of medium to the consumer device.

3. A control and cut-off device according to claim 2, characterized by the fact that the locking washer is fixed by a second outer locking ring which locks the washer axially.

4. A control valve for presetting the mode of operation of a radiator and for setting the flow of a heating medium through the radiator, said valve comprising a valve housing with a first inlet and a first return opening for the heating medium from a heating medium source and with a second inlet and a second return opening for such heating medium which passes through the radiator, a bore provided in the housing, said first and second inlet and return openings communicating with said bore, and a first cylindrical valve slide rotatably mounted in the valve housing and provided with first openings for setting the mode of operation of the radiator and with a bore therein adapted to house a second cylindrical valve slide, the improvement wherein said second valve slide is provided with second openings for setting the flow of heating medium through the radiator and with locking means for rotationally locking the second slide to rotate with the first slide, said locking means having first and second positions within the valve housing, such that when said locking means is in its first position said first/and second valve slides are locked to rotate together within said valve housing, when said locking means is changed to its second position said first and second valve slides are permitted to be rotated relative to each other for setting the flow of a heating medium through said radiator, and when said locking means is returned to its first position said control valve is now able to control and block the flow of the heating medium through the radiator.

5. An improved valve in accordance with claim 4, wherein the second cylindrical valve slide is provided with a wall at one end thereof, said wall separating the inlet flow from the return flow of said heating medium, such that the valve is thus adapted for connecting a system of radiators in parallel.

6. An improved valve in accordance with claim 4, wherein said second valve slide includes a wall at one end thereof, said wall having a through opening to provide a by-pass flow of heating medium between the first inlet and the return openings, the valve thus being adapted for connecting a system of radiators in series.

* * * * *